United States Patent
Yokota et al.

(10) Patent No.: US 7,273,403 B2
(45) Date of Patent: Sep. 25, 2007

(54) METHOD OF MANUFACTURING FLAT DISPLAY PANELS OF DIFFERENT SIZES FROM A COMMON BASE SUBSTRATE

(75) Inventors: Masahiro Yokota, Fukaya (JP); Shigeo Takenaka, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 339 days.

(21) Appl. No.: 10/875,400

(22) Filed: Jun. 25, 2004

(65) Prior Publication Data

US 2004/0233156 A1   Nov. 25, 2004

Related U.S. Application Data

(63) Continuation of application No. PCT/JP02/13526, filed on Dec. 25, 2002.

(30) Foreign Application Priority Data

Dec. 27, 2001  (JP) ............................ 2001-398183

(51) Int. Cl.
*H01J 9/24* (2006.01)
*H01J 9/26* (2006.01)
*H01J 9/42* (2006.01)

(52) U.S. Cl. .............................. 445/25; 445/24; 445/2; 445/3; 349/187

(58) Field of Classification Search ................. 445/24, 445/25; 349/187–192
See application file for complete search history.

(56) References Cited

U.S. PATENT DOCUMENTS

| | | | |
|---|---|---|---|
| 3,960,534 A | 6/1976 | Oates | |
| 4,195,892 A | 4/1980 | Riley et al. | |
| 4,640,581 A * | 2/1987 | Nakanowatari et al. | 349/149 |
| 4,691,995 A * | 9/1987 | Yamazaki et al. | 349/189 |
| 5,686,790 A | 11/1997 | Curtin et al. | |
| 5,717,476 A | 2/1998 | Kanezawa | |
| 6,426,588 B1 * | 7/2002 | Yanagisawa | 313/422 |
| 6,870,594 B1 * | 3/2005 | Zhang | 349/187 |
| 7,112,115 B1 * | 9/2006 | Yamazaki et al. | 445/25 |
| 2002/0008839 A1 * | 1/2002 | Miyai et al. | 349/190 |
| 2003/0231277 A1 | 12/2003 | Zhang | |

FOREIGN PATENT DOCUMENTS

| | | |
|---|---|---|
| CN | 1136215 A | 11/1996 |
| CN | 452814 | 9/2001 |
| EP | 0 609 074 A2 | 8/1994 |
| GB | 2 330 423 | 4/1999 |
| JP | 3-89431 | 4/1991 |
| JP | 4-149926 | 5/1992 |
| JP | 4-163422 | 6/1992 |
| JP | 7-318879 | 12/1995 |
| JP | 08328486 A * | 12/1996 |
| JP | 9-244547 | 9/1997 |

(Continued)

*Primary Examiner*—Mariceli Santiago
(74) *Attorney, Agent, or Firm*—Oblon, Spivak, McClelland, Maier & Neustadt, P.C.

(57) ABSTRACT

In a method of a manufacturing flat display apparatuses by working flat substrates, a flat substrate is prepared having a first region which is used as a flat display apparatus and a second region outside the first region. After the first region is worked as desired, the second region is cut and separated from the flat substrate.

17 Claims, 8 Drawing Sheets

FOREIGN PATENT DOCUMENTS

| | | |
|---|---|---|
| JP | 11-95231 | 4/1999 |
| JP | 11-119204 | 4/1999 |
| JP | 11-295755 | 10/1999 |
| JP | 11-305201 | 11/1999 |
| JP | 2000-10111 | 1/2000 |
| JP | 2000-162990 | 6/2000 |
| JP | 2000-193950 | 7/2000 |
| JP | 2000-267135 | 9/2000 |
| JP | 2001-305568 | 10/2001 |
| KR | 2000-0062516 | 10/2000 |
| KR | 2001-0001152 | 1/2001 |

* cited by examiner

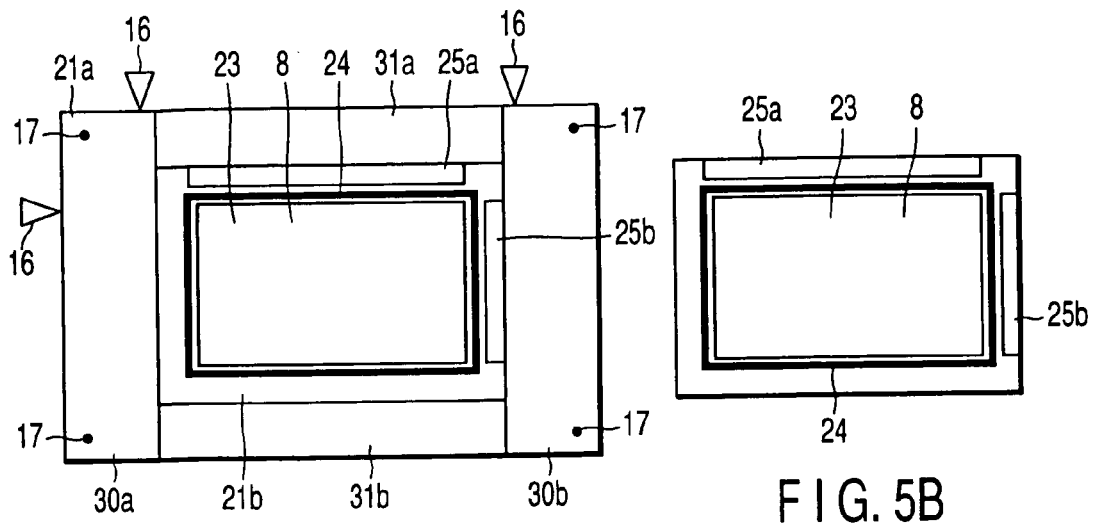
FIG. 5A
FIG. 5B
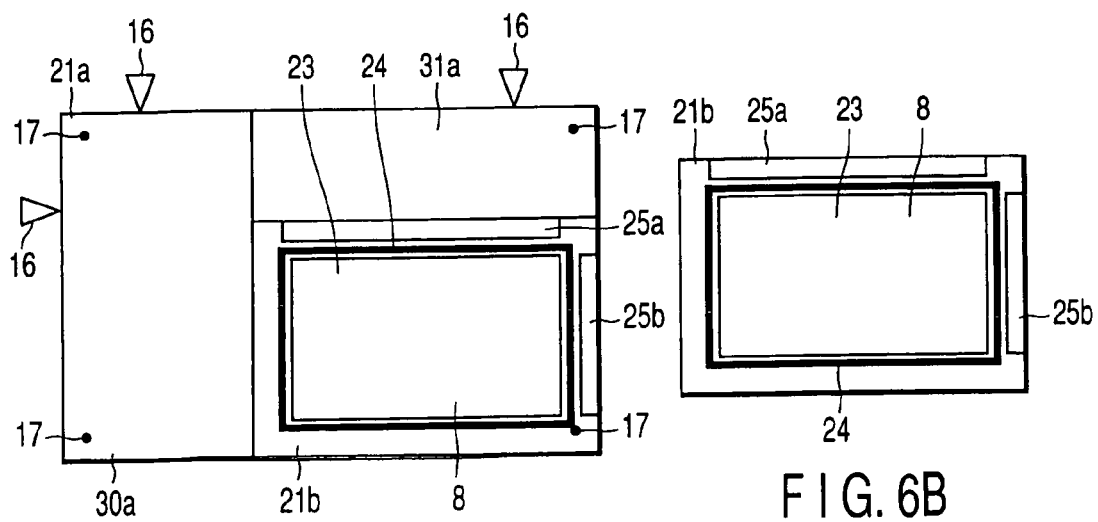
FIG. 6A
FIG. 6B

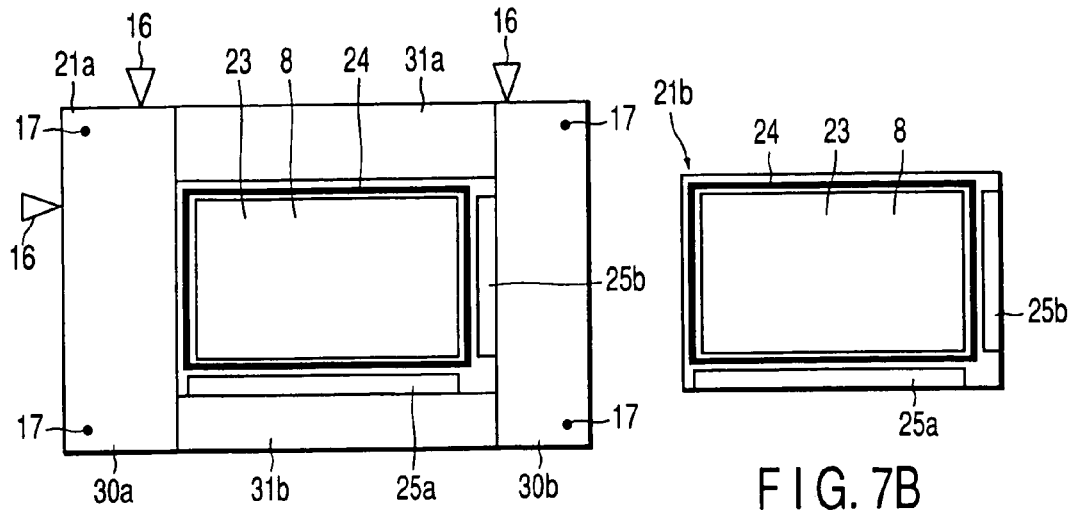
FIG. 7A
FIG. 7B
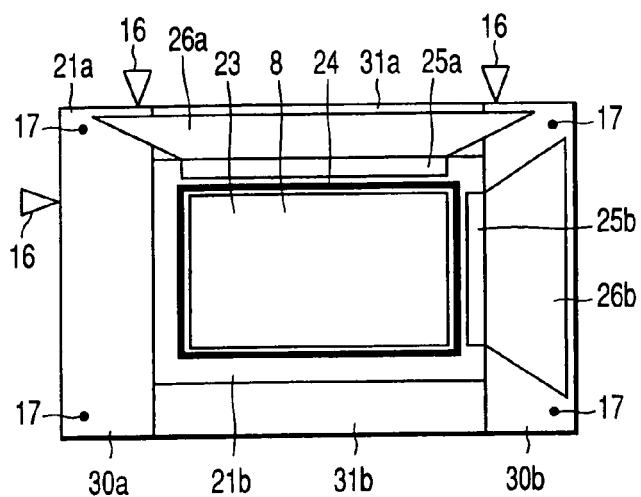
FIG. 8
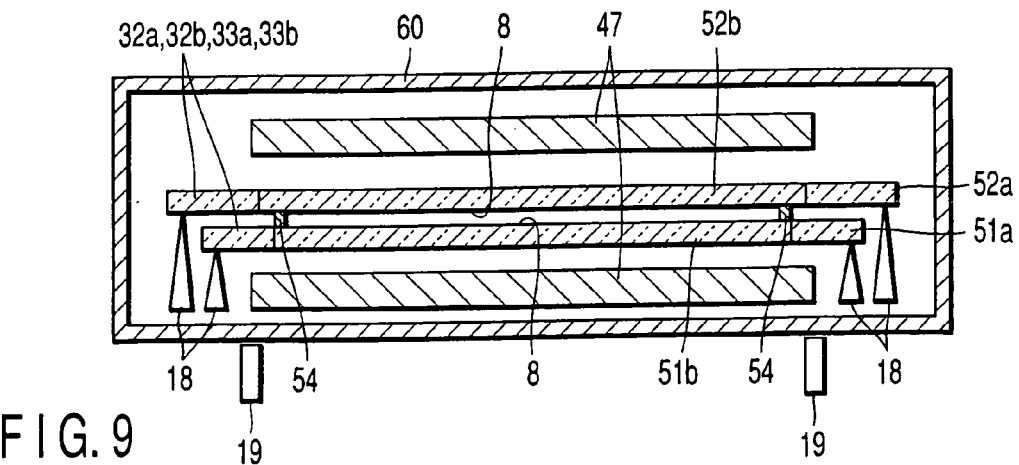
FIG. 9

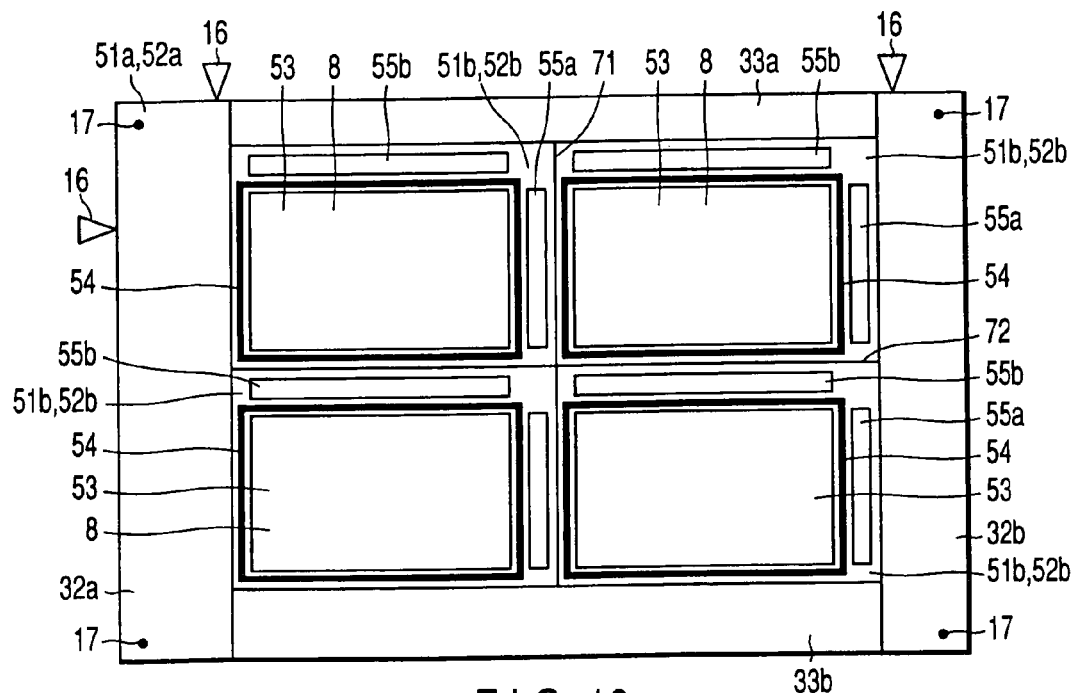
F I G. 10
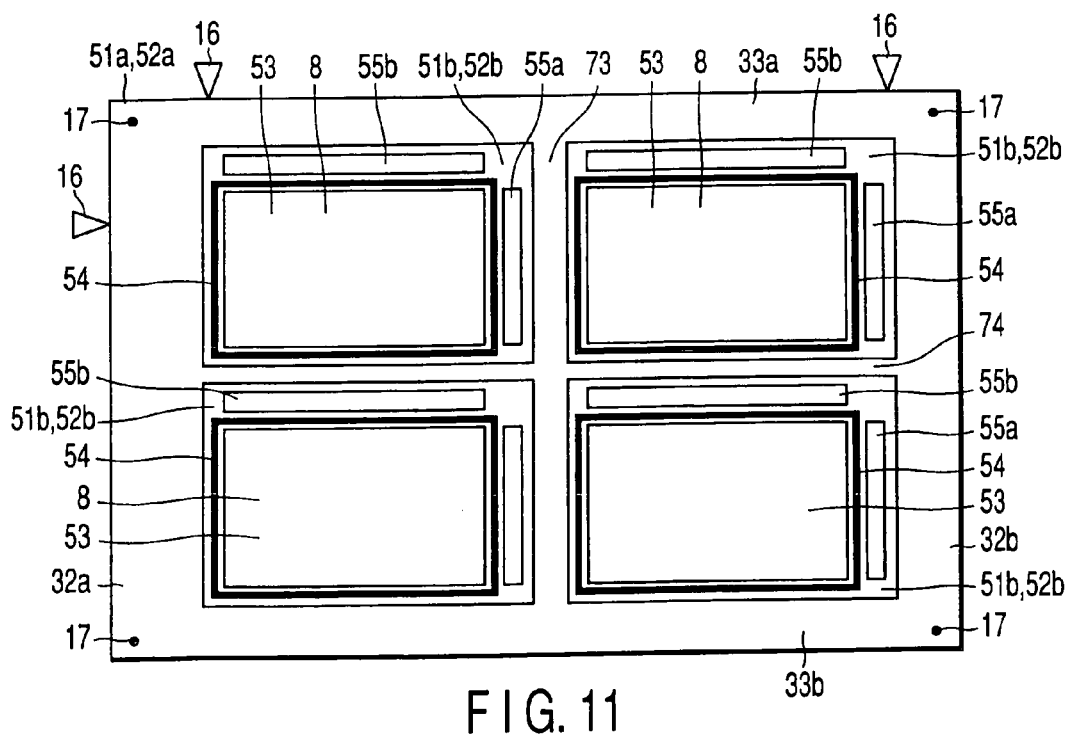
F I G. 11

METHOD OF MANUFACTURING FLAT DISPLAY PANELS OF DIFFERENT SIZES FROM A COMMON BASE SUBSTRATE

CROSS-REFERENCE TO RELATED APPLICATIONS

This is a Continuation Application of PCT Application No. PCT/JP02/13526, filed Dec. 25, 2002, which was not published under PCT Article 21 (2) in English.

This application is based upon and claims the benefit of priority from prior Japanese Patent Application No. 2001-398183, filed Dec. 27, 2001, the entire contents of which are incorporated herein by reference.

BACKGROUND OF THE INVENTION

1. Field of the Invention

This invention relates to a manufacturing method for flat display apparatuses.

2. Description of the Related Art

Recently, various flat display apparatuses have been developed as a next generation of lightweight, thin image display apparatuses to replace cathode-ray tubes (hereinafter referred to as CRT). These known flat display apparatuses include a liquid crystal display (hereinafter referred to as LCD), plasma display panel (hereinafter referred to as PDP), field emission display (hereinafter referred to as FED), surface-conduction emitter display (hereinafter referred to as SED), etc. In the LCD, the intensity of light is controlled by utilizing the orientation of a liquid crystal. In the PDP, phosphors are caused to glow by means of ultraviolet rays that are produced by plasma discharge. In the FED, phosphors are caused to glow by means of electron beams that are emitted from field-emission electron emitting elements. In the SED, phosphors are caused to glow by means of electron beams that are emitted from surface-conduction electron emitting elements.

Preferably, the size of display apparatuses, including ones that are not flat, should enjoy wide variation to cope with market demands. It is to be desired, moreover, that commodities of different sizes should be able to be quickly supplied to meet the needs.

If various sizes that are required by the market are to be covered by the manufacture, however, the manufacturing line may be complicated or the manufacturing equipment must be remodeled or, in some cases, changed completely on each occasion, thus requiring a vast investment.

Thus, in manufacturing processes for flat display apparatuses, flat substrates that are used in the flat display apparatuses must be formed having patterns for a phosphor screen, color filter, electron sources, plasma cells, drive wiring array, TFT array, etc., depending on the specifications of the display apparatuses. Manufacturing apparatuses that can cope with size differences must be used to manufacture a plurality of types of flat substrates of different sizes on the same manufacturing line.

BRIEF SUMMARY OF THE INVENTION

This invention has been made in consideration of these circumstances, and its object is to provide a method of manufacturing flat display apparatuses, in which flat display apparatuses of different sizes can be manufactured with use of a common substrate material and common manufacturing processes.

Another object of this invention is to provide a manufacturing method such that interference of manufacturing equipment with processes can be reduced and that the frame width of flat display apparatuses can be narrowed.

In order to solve the above problems, a method of manufacturing flat display apparatuses according to an aspect of this invention is a manufacturing method for flat display apparatuses, in which the flat display apparatuses are manufactured by working flat substrates, and comprises preparing a flat substrate having a first region which forms a flat display apparatus and a second region outside the first region, working at least the first region, and cutting and separating the second region from the flat substrate after the working.

Thus, the flat substrate in manufacturing processes is provided with the first region to be used as the flat display apparatus and the second regions, which are finally cut and separated as unnecessary for the flat display apparatus. An image display pattern such as a phosphor screen is formed in the first region of one flat substrate, while an image display pattern such as an electron source is provided in the first region of another flat substrate. If necessary, the second region is provided with electric wires that connect with the first region.

In the manufacturing processes, the flat substrate is fixed, held, and transported with use of the second regions, or electrical processing is carried out with use of the second regions. Thus, common mechanical and electrical processes can be carried out with use of common manufacturing equipment without regard to the size of flat display apparatuses to be manufactured, so that manufacturing processes can be realized corresponding to different sizes.

Since the second regions that are used to hold the manufacturing apparatuses are distant from the first region, moreover, bad influences of manufacturing apparatus portions on the first region can be eliminated, and the yield of production and quality of products can be improved. Further, a so-called frame region outside an image display region part of the flat display apparatus, which is obtained by cutting and separating substrate portions that are unnecessary for the flat display apparatus, can be minimized in size. Thus, there may be obtained a manufacturing method that can realize flat display apparatuses with high commercial value.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5A is a plan view schematically showing a flat substrate subject to a manufacturing method according to Example 1 of this invention;

FIG. 5B is a plan view schematically showing a flat display apparatus subject to the manufacturing method according to Example 1;

FIG. 6A is a plan view schematically showing a flat substrate subject to a manufacturing method according to Example 2 of this invention;

FIG. 6B is a plan view schematically showing a flat display apparatus subject to the manufacturing method according to Example 2;

FIG. 7A is a plan view schematically showing a flat substrate subject to a manufacturing method according to Example 3 of this invention;

FIG. 7B is a plan view schematically showing a flat display apparatus subject to the manufacturing method according to Example 3;

FIG. 8 is a plan view schematically showing a flat substrate and a flat display apparatus subject to a manufacturing method according to Example 4 of this invention;

FIG. 9 is a sectional view showing a vacuum sealing process of a manufacturing method according to Example 5 of this invention;

FIG. 10 is a plan view showing a flat substrate worked by a manufacturing method according to Example 6 of this invention;

FIG. 11 is a plan view showing a flat substrate according to a modification of Example 6;

DETAILED DESCRIPTION OF THE INVENTION

A method of manufacturing flat display apparatuses according to an embodiment of this invention will now be described in detail with reference to the accompanying drawings.

Figure 1:
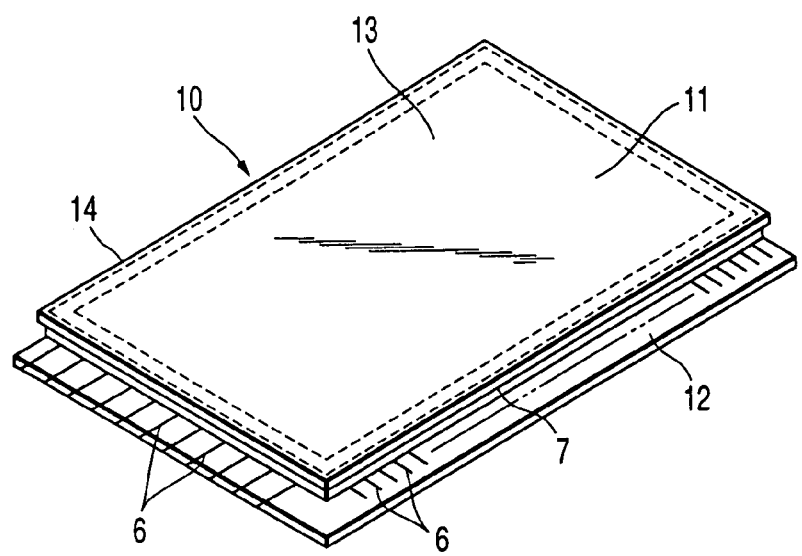
FIG. 1 is a perspective view showing an example of a flat display apparatus as an object of application of a manufacturing method according to an embodiment of this invention.
Figures 2A, 2B:
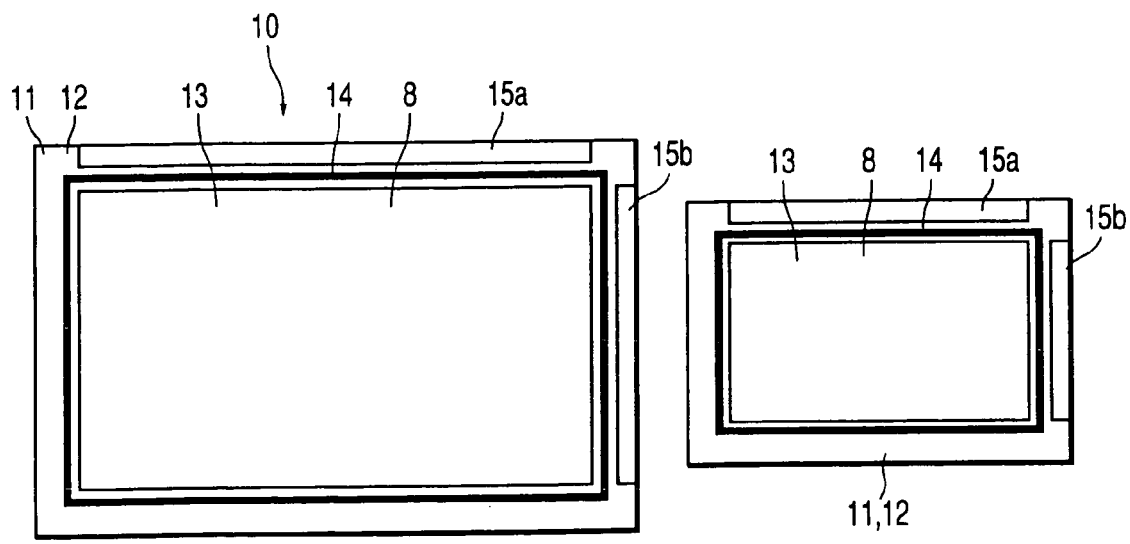
FIG. 2A is a plan view schematically showing the flat display apparatus.
FIG. 2B is a plan view schematically showing the flat display apparatus of a size different from that of the one shown in FIG. 2A.

As shown in FIGS. 1, 2A and 2B, a flat display apparatus 10 comprises two rectangular flat substrates 11 and 12, each with an image display region 13 provided thereon. Formed on the image display region 13 are various image display patterns 8 for a phosphor screen, color filter, electron sources, plasma cells, drive wiring array, TFT array, etc.

In order to cut off the image display region 13 from the ambience, the flat substrate 11 and the flat substrate 12 are stuck to each other by means of a frame 7 in a sealing region 14 that is situated around the image display region 13, and are sealed and combined with a given space between them.

Drive wires 6 for driving image display elements, such as the electron sources, plasma cells, etc., are led out of the peripheral portion of at least one of the flat substrates 11 and 12. The drive wires 6 are connected to a drive circuit board (not shown) in positions corresponding to mounting regions 15a and 15b.

FIGS. 2A and 2B individually show flat display apparatuses of the same configuration and different sizes.

In manufacturing processes for these flat display apparatuses, there are various incidental elements that are essential to the manufacture of the flat substrates 11 and 12.

Figure 3:
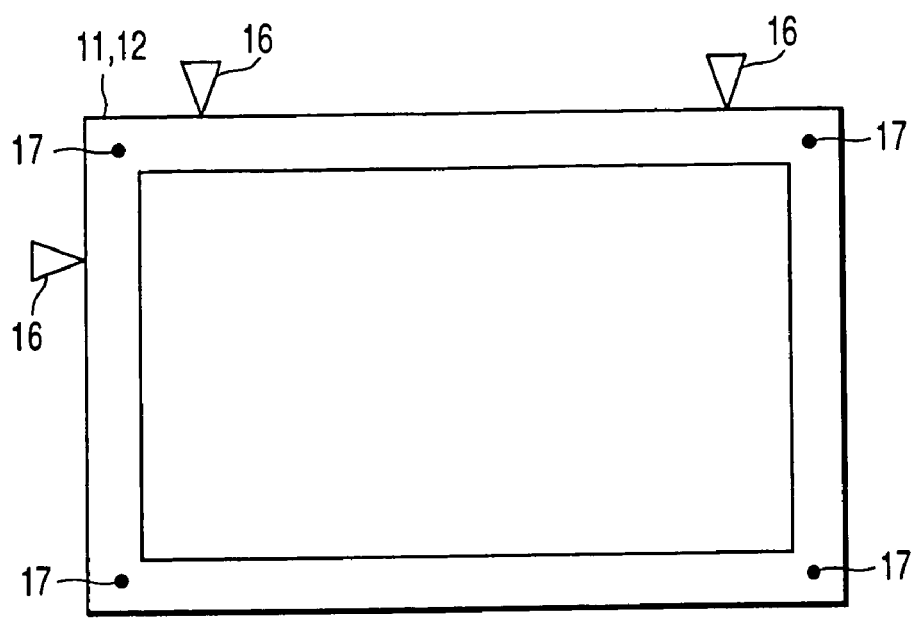
FIG. 3 is a plan view showing a general positioning process for a flat substrate.

Butting portions 16 for positioning the end faces of the substrate and register marks 17 for finely adjusting the superposition of a plurality of patterns are used in a working process for the flat substrate 11, such as a printing process or photolithography process as shown in FIG. 3, for example. Used in the manufacturing processes, moreover, are jigs (not shown) for supporting the periphery of the flat substrate 11 and inspection probes (not shown) that touch the mounting regions 15a and 15b of the flat substrate 11 to inspect wiring.

If two types of flat substrates having different sizes, such as the ones shown in FIGS. 2A and 2B, are to be manufactured in common manufacturing processes, however, much manufacturing equipment must be replaced as well as fixing, holding, and transporting devices used in the manufacturing processes, depending on the size difference between the flat substrates. The equipment includes the aforesaid reference butting portions 16, a mark recognition device, the supporting jigs, the inspection probes, etc.

In the manufacturing method for flat display apparatuses according to the present embodiment, therefore, flat substrates of a common size are prepared for flat display apparatuses of some supposable sizes. The individual manufacturing processes are executed using mechanical, thermal, electrical, and chemical manufacturing equipment that match the flat substrates of the common size. A first region for use as the flat display apparatus and second regions outside the first region are set on each flat substrate. After the first region of a certain size is worked, the second regions are cut and separated, whereupon the flat display apparatus is produced.

In fabricating flat display apparatuses of different sizes, the first region and its corresponding second regions, having different sizes, are provided on each flat substrate of the common size. By doing this, the flat display apparatuses of different sizes can be manufactured by common manufacturing equipment in the common manufacturing processes. The second regions of the flat substrate are also cut and separated in the case of flat display apparatuses of different sizes. According to this method, the substrates and the manufacturing equipment can be standardized for the image display apparatuses of the individual sizes, so that the flat display apparatuses of different sizes can be easily coped with at low cost. In consequence, the operating efficiency of the manufacturing equipment is improved, so that the manufacturing cost can be lowered.

Figure 4:
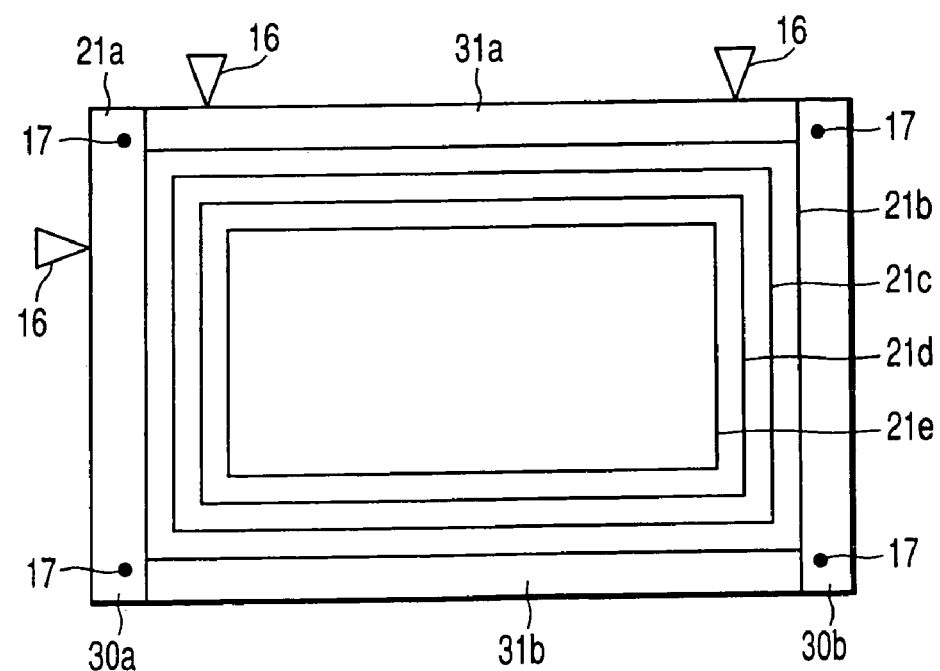
FIG. 4 is a plan view showing a flat substrate used in the manufacturing method according to the embodiment of this invention.

As shown in FIG. 4, a flat substrate 21a that is one size larger than first regions 21b, 21c, 21d and 21e used in flat display apparatuses of several supposable sizes is used as the flat substrate of the common size. Peripheral regions 30a, 30b, 31a and 31b around the first regions 21b, 21c, 21d and 21e of the flat substrate 21a are regarded as second regions. Thus, the manufacturing equipment can be standardized for the manufacture of the flat display apparatuses of several sizes. Since the second regions 30a, 30b, 31a and 31b are spread wider, moreover, adverse influences of the manufacturing equipment on the manufacturing processes can be lessened.

The necessary width or extent for each second region depends on the design of the manufacturing equipment that is used in common for the region. If it is too large, idle areas increase. Accordingly, the size of each second region must be set deliberately. In manufacturing a small-sized, flat display apparatus by the present manufacturing method, the second regions to be finally cut and separated from the flat substrate is wide. It is appropriate, therefore, to restrict differences in size between the flat image display apparatuses to be manufactured to about 10 inches at the maximum. The manufacture of flat display apparatuses having size differences of more than 10 inches entails an increase in idle areas in the second regions. Thus, an alternative manufacturing line should preferably be used to cope with this.

The following is a description of a case in which an FED is manufactured as a flat display apparatus, for example.

EXAMPLE 1

The following is a description of a case in which a 35-inch FED is manufactured as FEDs of different sizes ranging from 30 to 40 inches are manufactured in a common manufacturing line.

First, the rectangular flat substrate 21a is prepared as a common flat substrate, as shown in FIG. 5. The flat substrate 21a is given a size of 42 inches, for example.

Subsequently, the rectangular first region 21b to be used for the 35-inch FED is set on the flat substrate 21a, and this first region is worked as desired. Thus, a rectangular image display region 23 having the image display pattern 8, a sealing region 24 in the form of a rectangular frame situated around the image display region, mounting regions 25a and 25b situated outside the sealing region, and other necessary regions for the flat display apparatus are intensively formed in the first region 21b.

The first region 21b is set in the central portion of the flat substrate 21a. Thereupon, the second regions 30a, 30b, 31a and 31b are set around the first region 21b. All the necessary parts for the manufacture, including the register marks 17, butting portions 16, etc., are formed in advance in the second regions 30a, 30b, 31a and 31b. In the present example, the register marks 17 are formed individually in the four corner portions of the flat substrate 21a, and engaging portions that engage the butting members 16 are located in two spots on one long side of the flat substrate and in one spot on one short side.

The register marks 17 may be located at any points on the flat substrate 21a, obverse, reverse, inside, or outside. Preferably, the register marks 17 should be located on the end portions: of the flat substrate 21a, e.g., in the four corner portions. After the FED is manufactured, moreover, the second regions 30a, 30b, 31a and 31b are cut and separated, as mentioned later. If the register marks 17 are provided in the second regions from the start, therefore, spaces for positioning marks need not be secured in the first region 21b, so that the FED can be reduced to a narrow frame. Further, the flat substrate may be registered by means of the butting members 16 only, without using the register marks 17.

Manufacturing processes for working the flat substrate 21a, such as printing, photolithography, etc., can cope with sizes of up to 40 inches. In manufacturing processes such as printing, photolithography, etc., the flat substrate 21a is aligned with the manufacturing apparatus with a substrate end face of the flat substrate 21a abutting against the butting members 16 or with reference to the register marks 17 in the second regions 30a, 30b, 31a and 31b. In this case, all the equipment for the recognizing the butting members 16 and the register marks 17 can be standardized by standardizing the shape of the flat substrate 21a or the positions of the register marks 17 without regard to the size of the FED to be manufactured. Common devices can be also used as the transporting and supporting devices for the flat substrate 21a.

After the desired image display pattern 8 is formed on the first region 21b, the flat substrate 21a is delivered directly to the next process. Depending on the conditions of the manufacturing equipment for the next process, the flat substrate 21a may be delivered to the next process after the peripheral second regions 30a, 30b, 31a and 31b, which are useless or obstructive, are cut and separated partially or entirely.

Two desiredly worked flat substrates 21a are formed individually in the processes described above, and these two flat substrates are stuck to each other with the sealing region 24 between them. After the FED is completed with the respective first regions 21b of the flat substrates 21a, the second regions 30a, 30b, 31a and 31b are cut and separated from each flat substrate. Depending on the manufacturing apparatus or process, the two flat substrates 21a may be stuck together after the useless second regions of one or both of the flat substrates are cut and separated. In this case, the second regions are cut and separated again, thereafter, so that the frame portion of the flat display apparatus is smallest.

The flat substrate 21a is cut by the following methods. The methods include a scratched portion tensile stress cutting method in which the flat substrate is doubled after it is scratched along the boundaries between the first region 21b and the second regions 30a, 30b, 31a and 31b. The methods further include a method in which the flat substrate is cut by means of thermal stress that is produced as a heating element is brought into contact with it. Alternatively, a diamond cutter or water jet is used to cut the flat substrate.

Further, the various parts may be mounted by utilizing the register marks 17 before the second regions 30a, 30b, 31a and 31b are cut. In this case, the two flat substrates 21a of the common size are sealed together. Thereafter, flexible drive wires are mounted on the mounting region of at least one of the flat substrates 21a by using an anisotropic conductive film (ACF), for example. In doing this, the flexible drive wires are mounted by heat-bonding the ACF under pressure after the position of the ACF is adjusted with reference to the register marks 17 in the second regions 30a, 30b, 31a and 31b. Thereafter, the useless second regions can be cut and separated from each flat substrate 21a.

According to the manufacturing method for the FED constructed in this manner, the flat substrates 21a of the common size are provided with the first regions 21b of different sizes and the second regions 30a, 30b, 31a and 31b corresponding individually to the first regions 21b, so that FEDs of different sizes can be manufactured in by means of the common manufacturing equipment in the common manufacturing processes. Accordingly, the FEDs of different sizes can be easily coped with at low cost. Thus, the operating efficiency of the manufacturing equipment is improved, so that the FEDs can be provided at low cost.

In the manufacturing processes, the second regions 30a, 30b, 31a and 31b are used as regions for the incidental manufacturing equipment that support and align the flat substrates 21a, and are set around the first regions 21b in common for the individual sizes. Thus, the second regions 30a, 30b, 31a and 31b are secured having good areas around the flat substrates 21a that are common to the FEDs of different sizes. By doing this, the manufacturing equipment that are used to support and align the substrates are standardized, and the flat substrates 12a are standardized. Thus, flexible, high-productivity manufacturing processes can be realized.

Further, the second regions 30a, 30b, 31a and 31b are isolated from the first regions 21b, have good areas, and are finally cut and separated from the first regions. Thus, the manufacturing processes, including processes of holding, fixing, and transporting the substrates, can be carried out securely and safely. At the same time, bad influences of the manufacturing processes on the first regions and the FED fabricating processes, such as temperature irregularity, can be reduced, and the quality and yield of products can be improved. In consequence, narrow-frame FEDs without any useless regions can be realized.

The manufacturing method using the single flat substrate or the two flat substrates has been described in connection with Example 1. In manufacturing a flat display apparatus in which a grid is located between two first regions, for example, however, the same manufacturing method as aforesaid may be applied to the grid.

In some cases, according to the manufacturing method described above, the manufacturing equipment may be shared, and besides, member shapes for transfer films, protective sheets, sputtering targets, etc. may be standardized.

EXAMPLE 2

According to Example 2, as shown in FIGS. 6A and 6B, various manufacturing processes are carried out with a first region 21b set near one corner portion of a flat substrate 21a and with use of only two second regions 30a and 31a. According to the present example, there are few cut portions, so that the manufacturing efficiency can be improved. This example shares other configurations with the foregoing example, and a detailed description of them is omitted.

EXAMPLE 3

According to Example 3, as shown in FIGS. 7A and 7B, second regions 30a, 30b, 31a and 31b are formed so that a frame region of a first region 21b that is situated outside a sealing region 14 is asymmetric, in order to make the first region as compact as possible. More specifically, the other two side portions of the frame region are made narrower than those two side portions on which mounting regions 25a and 25b are formed.

According to this manufacturing method, differences that are attributable to differences in size between display apparatuses to be manufactured involve differences in cutting specifications only. Therefore, this example shares load on the manufacturing processes with the other examples even though cutting and the like are made so that the frame region is asymmetric. According to the present example, which shares the same functions and effects with the foregoing alternative examples, the frame of a resulting FED can be further narrowed. This example shares other configurations with the foregoing examples, and a detailed description of them is omitted.

EXAMPLE 4

According to the present example, as shown in FIG. 8, inspection wiring regions 26a and 26b are arranged in second regions 30a, 30b and 31a that are situated outside mounting regions 25a and 25b of a flat substrate 21a, during the manufacturing processes. They are formed by leading out wiring portions individually from the mounting regions in an enlarged form.

In subjecting a wiring array to open/short inspection using inspection probes (not shown), therefore, the locations of the inspection probes can be standardized without regard to the size of a first region 21b. Further, the wiring space is widened, so that the inspection probes can be contacted more securely and introduced more easily. Thus, the inspection time can be shortened, so that the manufacturing efficiency can be improved.

Further, lead-out patterns of the inspection wiring regions 26a and 26b are adjusted also for FEDs that are different in resolution or number of wires, whereby inspection probes corresponding to the maximum resolution can be prepared in advance. By doing this, FEDs of all sizes can be inspected.

As another example of application, moreover, the second regions 30a, 30b, 31a and 31b may be partially worked in a manufacturing process. For example, the second regions 30a, 30b, 31a and 31b are partially formed with a print pattern that resembles the image display region 23 in a printing process or the like. Improvement on quality control can be made by inspecting this partial print pattern and checking the image display region 23 for quality or by feeding back the result of inspection to control conditions for the printing process.

According to the present example, moreover, the second regions 30a, 30b, 31a and 31b are subjected to the same treatment for the image display region 23 that is carried out in various processes, whereupon a plurality of small treated regions are formed side by side in due order in each second region. Further, a control code, such as a bar code for the discriminative recognition of the flat substrate is assigned to each of the second regions 30a, 30b, 31a and 31b. After the second regions 30a, 30b, 31a and 31b are cut from the flat substrate 21a, he control codes can be used to control or inspect the treated regions of the second regions, thus serving for product quality control or analysis of causes of problems, if any. This example shares other configurations with the foregoing examples, and a detailed description of them is omitted.

EXAMPLE 5

In a flat display apparatus, such as an FED or SED, the inside of an envelope that is composed of two flat substrates must be kept in a vacuum. Also in a PDP, discharge gas must be charged after the inside of the envelope is temporarily evacuated. A method of evacuating the envelope in this manner includes a manufacturing process in which a front substrate and a rear substrate that constitutes the envelope are finally assembled in a vacuum tank.

In this case, the front substrate and the rear substrate that are first located in the vacuum tank are heated fully. This is done in order to reduce gas discharge from the inner surfaces of the substrates that constitutes a main cause of lowering of the degree of vacuum of the envelope. When the front substrate and the rear substrate are then cooled so that the degree of vacuum in the vacuum tank is fully enhanced, getter flashing is carried out in the vacuum tank to form a getter film on a phosphor screen, in order to improve and maintain the degree of vacuum of the envelope. Thereafter, the front substrate and the rear substrate are heated again to a temperature such that a sealing material melts, and the front substrate and the rear substrate are lapped together and cooled so that the sealing material solidifies.

The vacuum envelope fabricated by this method is obtained in a process that combines a getter process, sealing process, and vacuum encapsulation process, and can enjoy a very satisfactory degree of vacuum without requiring any such time for the case where the inside of the envelope is exhausted by means of an exhaust pipe.

According to the present example, as shown in FIG. 9, two flat substrates 51a and 51b that are treated as desired by the same method for the foregoing examples are prepared. They are located in a vacuum tank 60 in a manner such that a first region 51b of the flat substrate 51a and a first region 52b of the flat substrate 52a are opposed to each other. In order to fix the relative positions of the first regions 51b and 52b, in doing this, the respective substrate end faces of second regions 32a, 32b, 32a and 33b of the two flat substrates 51a and 51b are butted individually against butting members (not shown) to be aligned in position.

Image display patterns 8 of the flat substrates 51a and 52a are monitored by means of a camera 19 outside the vacuum tank 60 as the second regions 32a, 32b, 32a and 33b are supported individually by means of separate supporting members 18. Thereafter, the flat substrates 51a and 52a are sealed to each other in positions corresponding to sealing regions 54 by heating the flat substrates 51a and 52a to melt the sealing material by means of a heater 47 in the vacuum tank 60.

Thus, the sealing process that is carried out in a vacuum includes many steps that utilize the peripheral portions of the flat substrates, such as the steps of supporting the flat substrates 51a and 52a and butting the substrate end faces. Further, heating and pressurization are carried out simultaneously. Also for these treatments, as mentioned before, the size and shape of the flat substrates 51a and 52a are standardized, and the second regions 32a, 32b, 32a and 33b and the first regions 51b and 52b are cut and separated after the desired treatments are finished. By doing this, the manufacture of FEDs of different sizes can be easily coped with, and problems, such as heating temperature irregularity that depends on the manufacturing equipment, can be eased.

Although the sealing process has been described in connection with the present example, the same method may be also applied to any other processes of heat treatment in a vacuum. This example shares the manufacturing method for the flat substrates themselves with the foregoing examples, and a detailed description of the method is omitted.

EXAMPLE 6

According to this example, as shown in FIG. 10, a large-sized flat substrate 51a is provided with four small-sized first regions 51b of the same size, and second regions 32a, 32b, 33a and 33b are formed around these four first regions. An image display region 53, sealing region 54, and mounting regions 55a and 55b are formed in each first region 51b by the same method for the foregoing examples.

Further, a large-sized flat substrate 52a is prepared having four small-sized first regions 52b of the same size and second regions 32a, 32b, 33a and 33b around these four first regions.

These flat substrates 51a and 52a are opposed to each other in the vacuum tank 60 in the same method for Example 5 shown in FIG. 9. The respective end faces of the second regions 32a, 32b, 33a and 33b are fixed by being butted against butting members, whereby the two flat substrates 51a and 52a are relatively aligned in position.

Subsequently, the flat substrates 51a and 52a are heated by means of a heater and pressurized at the same time. By doing this, the respective sealing regions 54 of the first regions 51b and 52b are fused and sealed together. After the second regions 32a, 32b, 33a and 33b are cut and removed from the first regions 51b and 52b, hereafter, the first regions are cut and separated along division lines 71 and 72 from one another. Thus, the four FEDs can be manufactured at a time.

As shown in FIG. 11, moreover, second regions 73 and 74 may be provided between a plurality of first regions 51b and 52b that adjoin one another. In this case, the second regions 73 and 74 can be utilized as regions that ease interaction between the adjacent flat substrates 51a and 52a. Alternatively, they may be utilized as formation regions for leader wires for inspection that are arranged near the respective centers of the flat substrates 51a and 52a off the surrounding second regions 32a, 32b, 33a and 33b.

Figure 12:
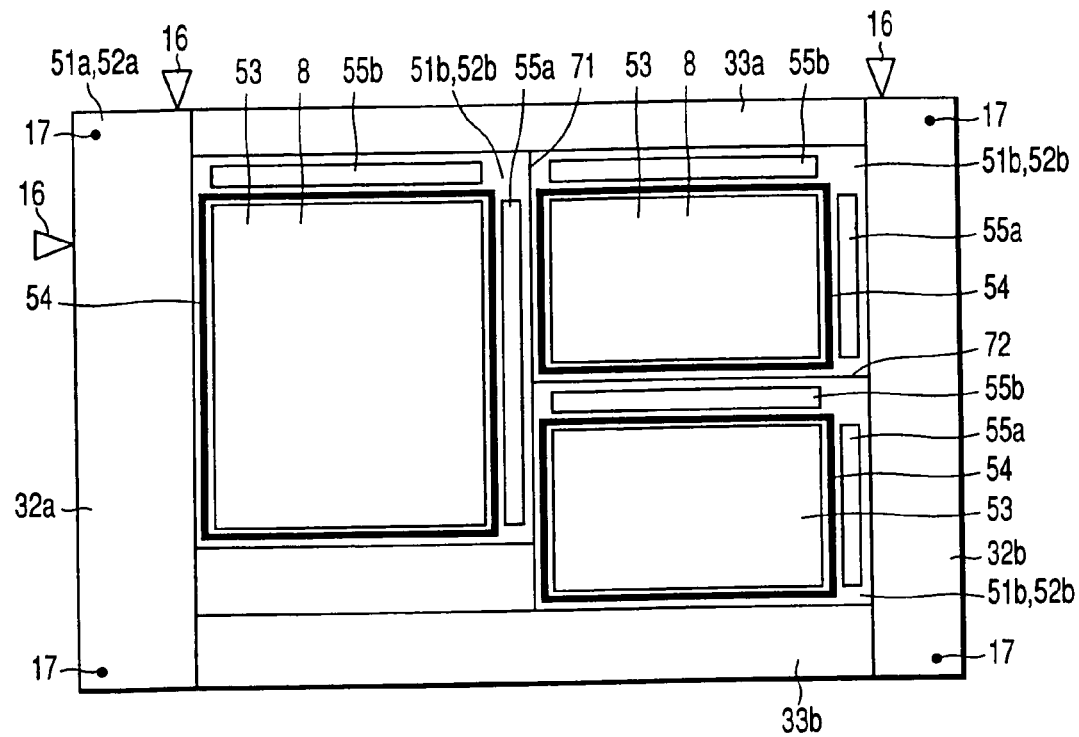
FIG. 12 is a plan view showing a flat substrate according to another modification of Example 6.

As shown in FIG. 12, moreover, the first regions 51b and 52b on the flat substrates 51a and 51b may be formed as regions of different sizes. Also in this case, a plurality of FEDs can be manufactured at a time by the same method as aforesaid.

EXAMPLE 7

Figure 13:
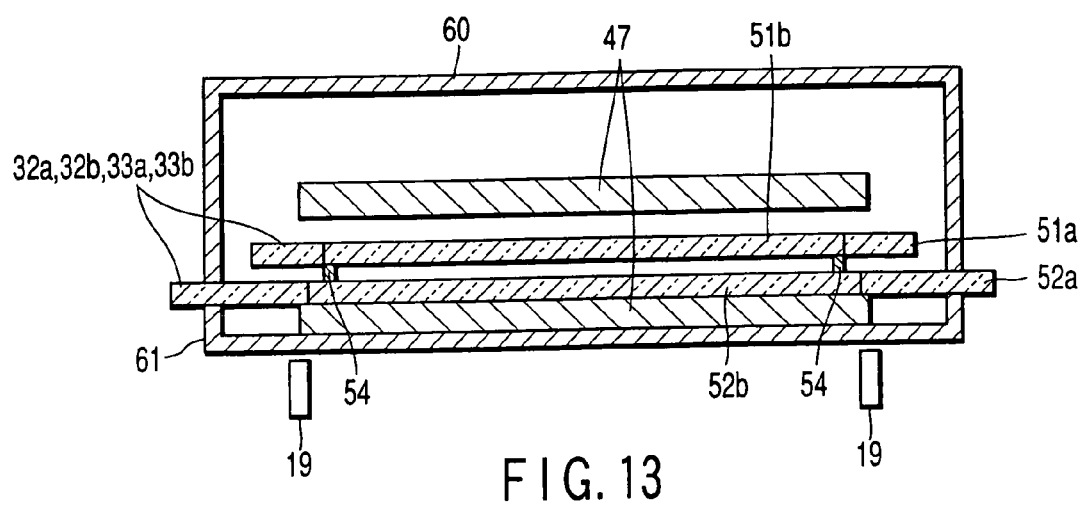
FIG. 13 is a sectional view showing a vacuum sealing process of a manufacturing method according to Example 7 of this invention.

In heating flat substrates 51a and 52a in a vacuum tank 60, according to Example 7, he vacuum tank 60 is brought into contact with the second regions 32a, 32b, 33a and 33b of one flat substrates, e.g., flat substrate 52a, and the flat substrate 52a itself forms one wall of the vacuum tank, as shown in FIG. 13. Further, the peripheral edge portion of the flat substrate 52a projects from the vacuum tank 60 into the atmosphere.

Furthermore, a decompression tank 61 is located on the backside of the flat substrate 52a, and the inside of the decompression tank is decompressed to about 1/1 to 1/1,000 atm. so that a high atmospheric pressure does not act on the flat substrate 52a. The flat substrates 51a and 52a, et in the aforesaid manner, are heat-treated and sealed together by the same method for Example 5.

According to this arrangement, heat treatment can be carried out with the respective peripheral portions of the second regions 32a, 32b, 33a and 33b of the flat substrate 52a exposed to the atmosphere. Thus, failure in the first regions 51b and 52b that are situated in the vacuum tank 60 can be checked for occurrence from outside the vacuum tank. Further, the rear flat substrate 52a can be placed directly on the heater 47 as it is heated.

EXAMPLE 8

Figure 14:
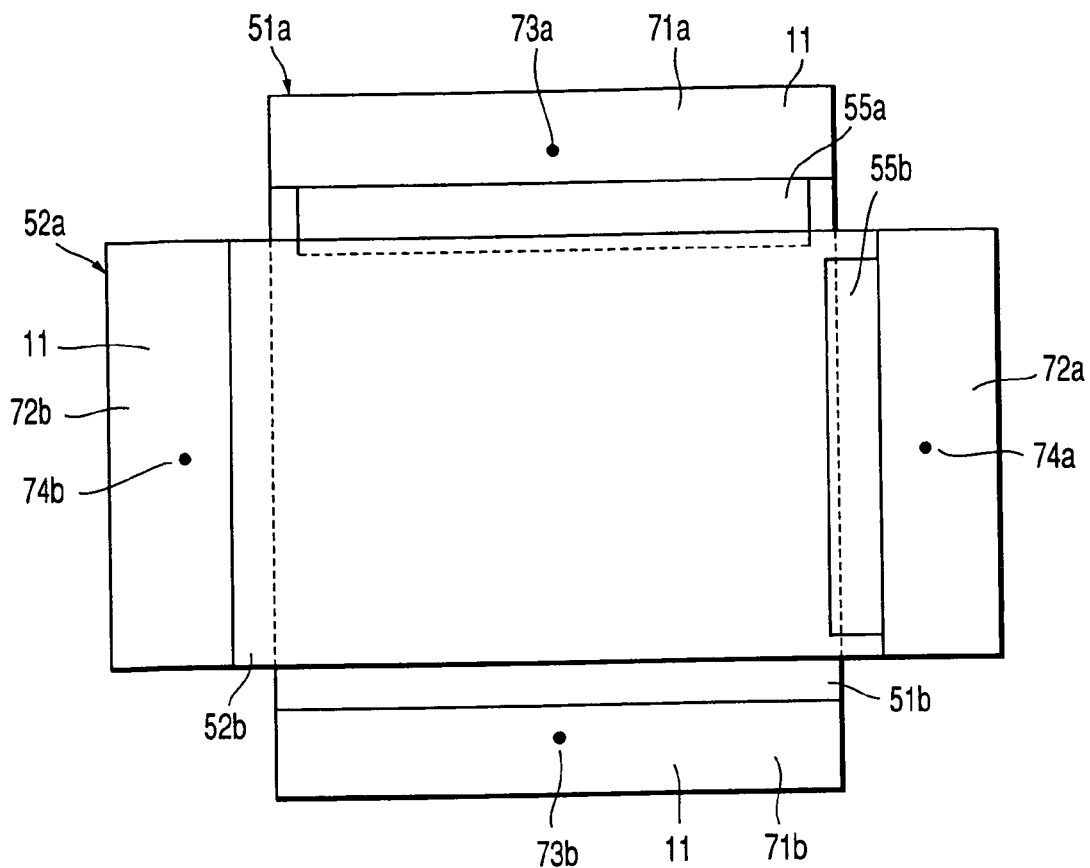
FIG. 14 is a plan view showing flat substrates worked by a manufacturing method according to Example 8 of this invention.
Figure 15:
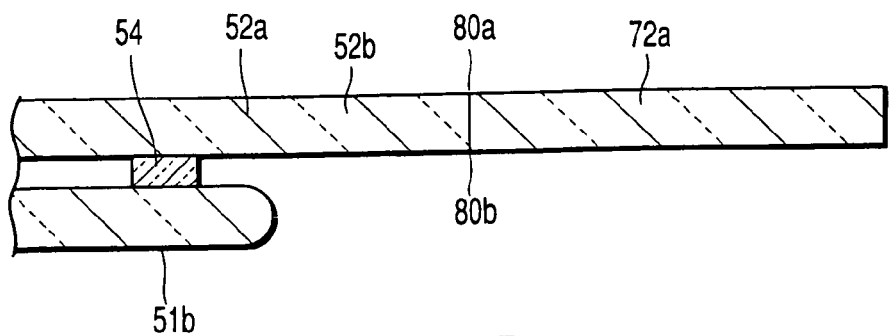
FIG. 15 is a sectional view showing the flat substrates sealed by the manufacturing method according to Example 8.

If mounting regions 55a and 55b are formed, respectively, on first regions 51b and 52b of two flat substrates 51a and 52a that are sealed to each other, as shown in FIGS. 14 and 15, the one flat substrate 51a has second regions 71a and 71b outside two long sides, individually, of its first region on which the mounting region 55a is formed. The other flat substrate 52a has second regions 72a and 72b outside two short sides, individually, of its first region 52b on which the mounting region 55b is located. The two flat substrates 51a and 52a are opposed to each other so that the second regions 71a and 71b of the flat substrate 52a project from the flat substrate 51a and that the second regions 72a and 72b of the flat substrate 52a project from the flat substrate 51a, and these substrates are sealed to each other.

According to the arrangement described above, cut surfaces along which the second regions of each flat substrate are cut and separated are situated at an outside distance from the end faces of the other flat substrate even after the substrates are sealed together. Accordingly, the second regions can be easily cut and separated, and sharp angular cut portions 80a and 80b can be chamfered.

In this case, the second regions 71a, 71b, 72a and 72b can be used to support and align the substrates in the sealing process or the like. For example, the long-side-direction positions, short-side-direction positions, and rotational positions of the flat substrates 51a and 52a can be properly aligned by means of register marks 73a, 73b, 74a and 74b that are located on the respective central axes of the flat substrates 51a and 52a.

In order to cope with different sizes, a common length is used for the side length of those sides of the flat substrates 51a and 52a on which the second regions 71a, 71b, 72a and 72b are provided. The lengths of the sides perpendicular to those sides vary according to the size. In this case, the length of one side of each flat substrate varies according to the substrate size. Since those portions which are used to support and align the substrates are substrate end portions that mainly include the second regions having a standardized side length, however, the manufacturing equipment can be standardized, as in the foregoing alternative examples.

EXAMPLE 9

Figure 16A:
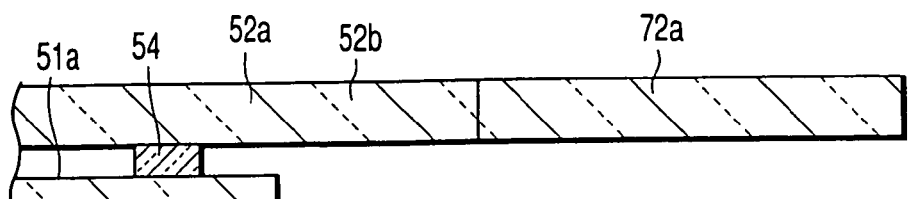
FIGS. 16A to 16C are sectional views individually showing cutting and separating processes and a chamfering process for flat substrates in a manufacturing method according to Example 9 of this invention.
Figure 16B:
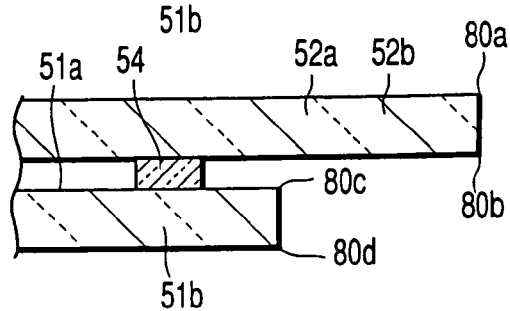

After the two flat substrates 51a and 52a are sealed together by the aforesaid method, as shown in FIG. 16A, a second region 30a is cut and separated, as shown in FIG. 16B. Thereupon, sharp angular cut portions 80a, 80b, 80c and 80d appear. Preferably, these sharp angular cut portions should be chamfered in view of safety and the durability of flexible wires that are attached to mounting regions. However, the angular portion 80c on the sealed surface side is situated in a position such that it cannot be chamfered with ease.

Figure 16C:
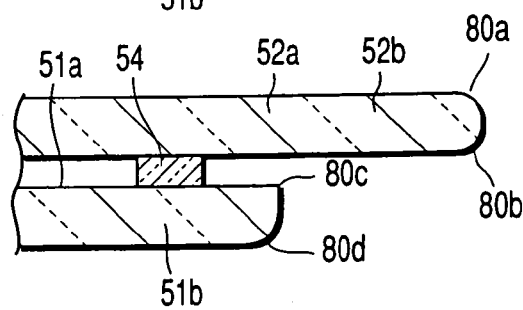

According to present example, as shown in FIG. 16C, therefore, the angular portion 80c is not chamfered. If the angular portion 80c is left unchamfered, it does not result directly in the aforesaid problem, since it is situated in a position that is inaccessible to the outside and cannot be reached by a flexible wiring board.

Figure 17:
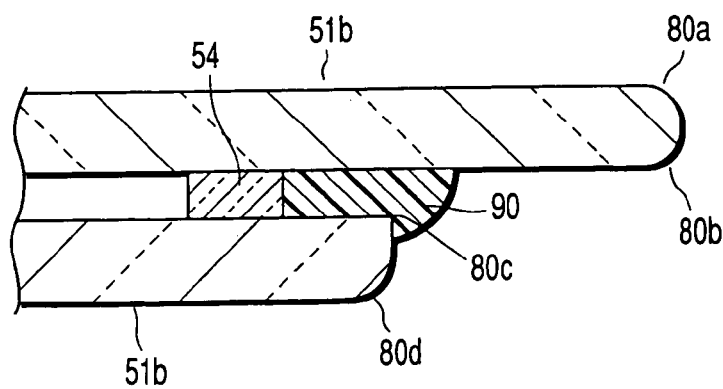
FIG. 17 is a sectional view showing flat substrates according to a modification of Example 9.
Figure 18:
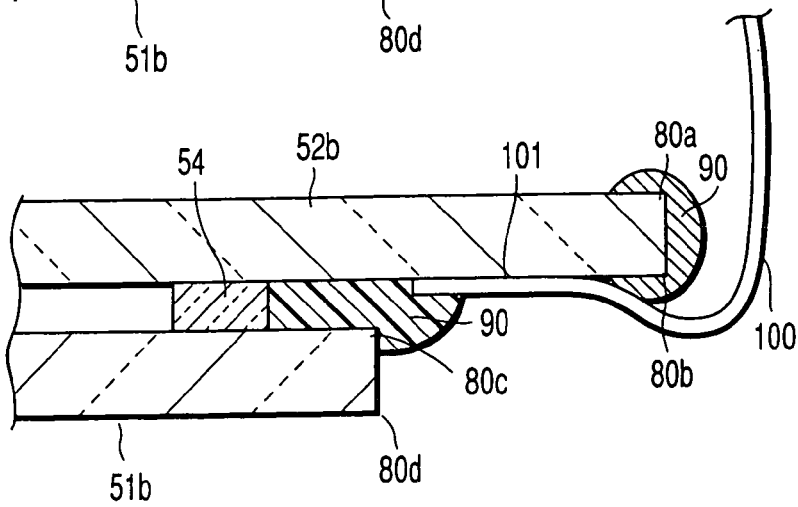
FIG. 18 is a sectional view showing flat substrates according to another modification of Example 9.

Methods shown in FIGS. 17 and 18 may be sued as alternative treatment methods for the sharp angular cut portions. In the example shown in FIG. 17, the angular portion 80c that cannot be chamfered with ease is covered by a protective material 90. Thus, the angular portion 80c can be prevented from being touched from the outside.

A resin, adhesive agent, putty, or tape is used for the protective material 90.

In the example shown in FIG. 18, moreover, all the angular portions 80a, 80b, 80c and 80d of the substrates are covered with the protective material 90 without being chamfered at all. The protective material 90 serves also to encapsulate a bonded surface 101 of the flexible wiring board 100.

Normally, the flexible wiring board 100 is attached to the substrates by being heat-bonded with use of an anisotropic conductive film under pressure. However, the bonded portion 101 that bears proof pressure between wires that are arranged at short pitches or the like is susceptible to external moisture and foreign matter, and is subjected to force when the flexible wiring board 100 is bent.

According to the present example, the protective material 90 is effective means that can serve both to cover the sharp angular portions and to protect the bonded surface 101 of the flexible wiring board 100.

This example shares the manufacturing method for the flat substrates themselves with the foregoing examples, and a detailed description of the method is omitted.

This invention is not limited to the examples described, and various modifications may be effected without departing from the scope of the invention. Although the manufacture of FEDs has been described in connection with the foregoing examples, for example, this invention is not limited to FEDs and may be also applied to the manufacture of any other flat display apparatuses, such as SEDs, PDPs, etc. The dimensions of the flat substrates used, the dimensions and number of first regions to be formed, etc. may be selected as required without being limited to the values described in conjunction with foregoing examples.

What is claimed is:

1. A method of manufacturing flat display apparatuses, in which the flat display apparatuses are manufactured by working flat substrates, the method comprising:
   preparing a flat substrate having thereon a plurality of first regions of different sizes which individually form the flat display apparatuses and second regions outside the first regions;
   working the respective first regions; and
   cutting and separating the second regions from the flat substrate after the working,
   wherein the working includes forming a substantially rectangular image display region and a frame portion in the first region, the frame portion being situated around the image display region and having a plurality of side portions, and providing mounting regions individually on at least two side portions of the frame portion so that the width of the other side portions of the frame portion on which the mounting regions are not provided is smaller than the width of the side portions on which the mounting regions are provided.

2. A method of manufacturing flat display apparatuses according to claim 1, wherein the given working is carried out for the first regions of the plurality of sizes by using a common manufacturing apparatus.

3. A method of manufacturing flat display apparatuses according to claim 1, wherein the flat substrate is rectangular, and the second region is located on end portions along at least one long side and one short side of the flat substrate.

4. A method of manufacturing flat display apparatuses according to claim 3, wherein the flat substrate is rectangular, and the second region is located on end portions along four sides of the flat substrate.

5. A method of manufacturing flat display apparatuses according to claim 3, wherein the flat substrate has thereon a plurality of first regions which individually constitute flat display apparatuses, and the second region is located so as to cover regions between the first regions.

6. A method of manufacturing flat display apparatuses according to claim 1, wherein the working includes supporting and fixing the flat substrate in positions corresponding to the second region.

7. A method of manufacturing flat display apparatuses according to claim 1, wherein the flat substrate is aligned with use of end portions of the second region.

8. A method of manufacturing flat display apparatuses according to claim 1, wherein the working includes working in a vacuum.

9. A method of manufacturing flat display apparatuses according to claim 8, wherein the working in the vacuum includes a heat treatment for the flat substrate.

10. A method of manufacturing flat display apparatuses according to claim 8, wherein the working in the vacuum includes forming a getter film in the first region by getter flashing in the vacuum.

11. A method of manufacturing flat display apparatuses according to claim 10, wherein one flat substrate, out of the two flat substrates, is provided with second regions outside two long sides of the first region thereof, and the other flat substrate is provided with second regions outside two short sides of the first region thereof.

12. A method of manufacturing flat display apparatuses according to claim 8, wherein two flat substrates are prepared each having the first region and the second region, and the two flat substrates are sealed to each other in the vacuum after the respective first regions of the flat substrates are subjected to the working.

13. A method of manufacturing flat display apparatuses according to claim 1, wherein two flat substrates are prepared each having the first region and the second region, and the working includes sealing the two flat substrates, each having the first and second regions, to each other and covering a cut-side end portion of at least one of the flat substrates, from which the second region is separated, with a protective material after the sealing.

14. A method of manufacturing flat display apparatuses according to claim 13, wherein the working includes forming a substantially rectangular image display region and a frame portion in the first region, the frame portion being situated around the image display region and having a plurality of side portions, providing mounting regions individually on at least two side portions of the frame portion, adhesively bonding flexible wiring boards to at least two side portions of the frame portion, and encapsulating bonded regions of the flexible wiring boards with the protective material.

15. A method of manufacturing flat display apparatuses according to claim 1, wherein the flat display apparatus is a field emission display or a surface-conduction emitter display.

16. A method of manufacturing flat display apparatuses, in which the flat display apparatuses are manufactured by working flat substrates, the method comprising:
   preparing a flat substrate having a first region which constitutes a flat display apparatus and second regions outside the first regions;
   working at least the first region, the working including providing specific patterns in the second region, the specific patterns including control codes for the flat display apparatus, the flat substrate and the formed flat display apparatus being worked and controlled in quality in accordance with the specific patterns;
   cutting and separating the second regions from the flat substrate after the working; and
   carrying out quality control for the flat display apparatus with use of the specific patterns and the control codes in the cut and separated second region after the second region is removed by cutting.

17. A method of manufacturing flat display apparatuses according to claim 16, wherein the specific patterns include wiring patterns led out through the first region, and the flat substrate is worked and inspected with use of the specific patterns.

* * * * *